Oct. 30, 1923.
V. L. HOLT
1,472,394
SAW ATTACHMENT FOR TRACTORS
Filed March 28, 1921   2 Sheets-Sheet 1
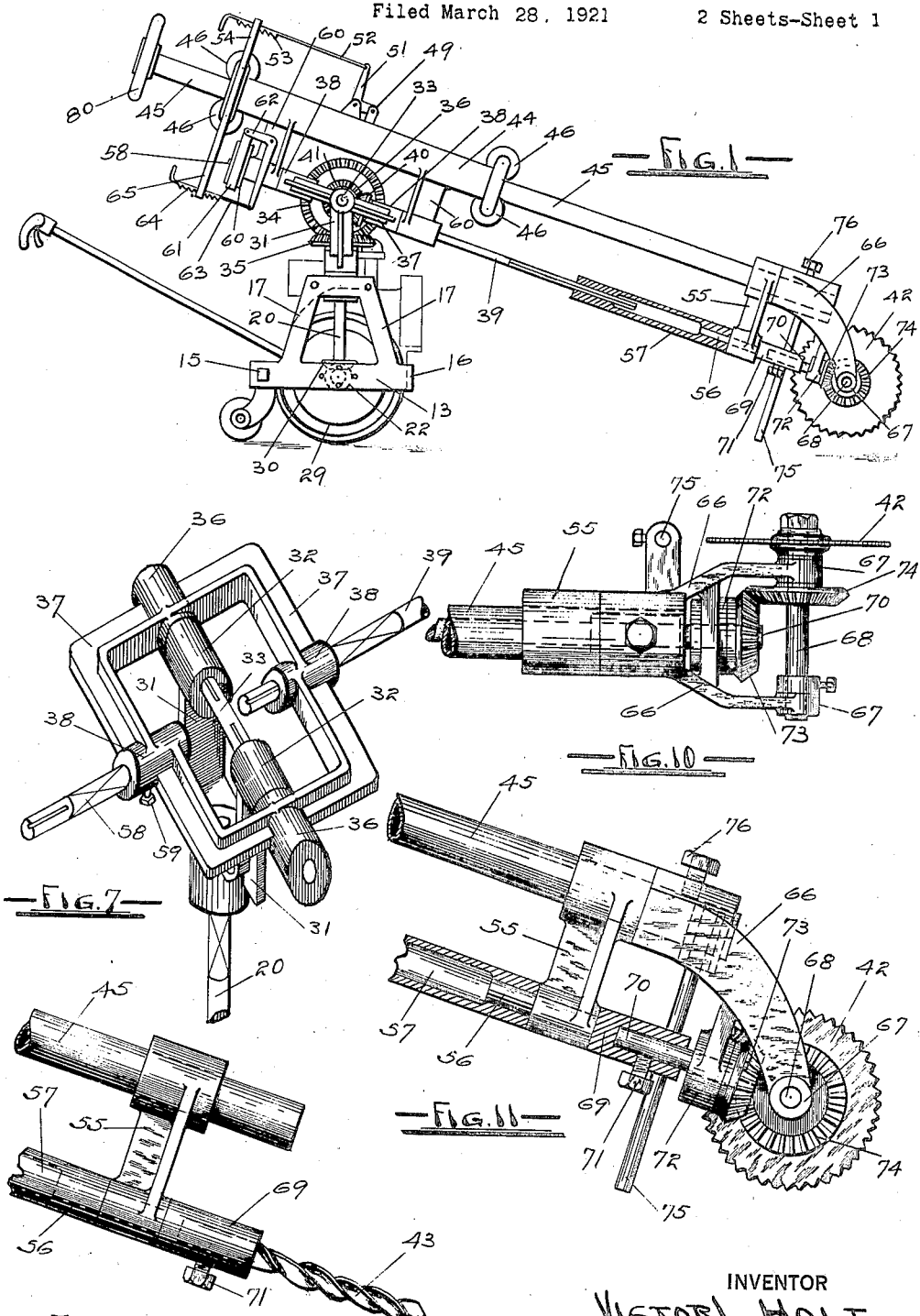
INVENTOR
VICTOR L. HOLT
BY
C. F. Blake
ATTORNEY

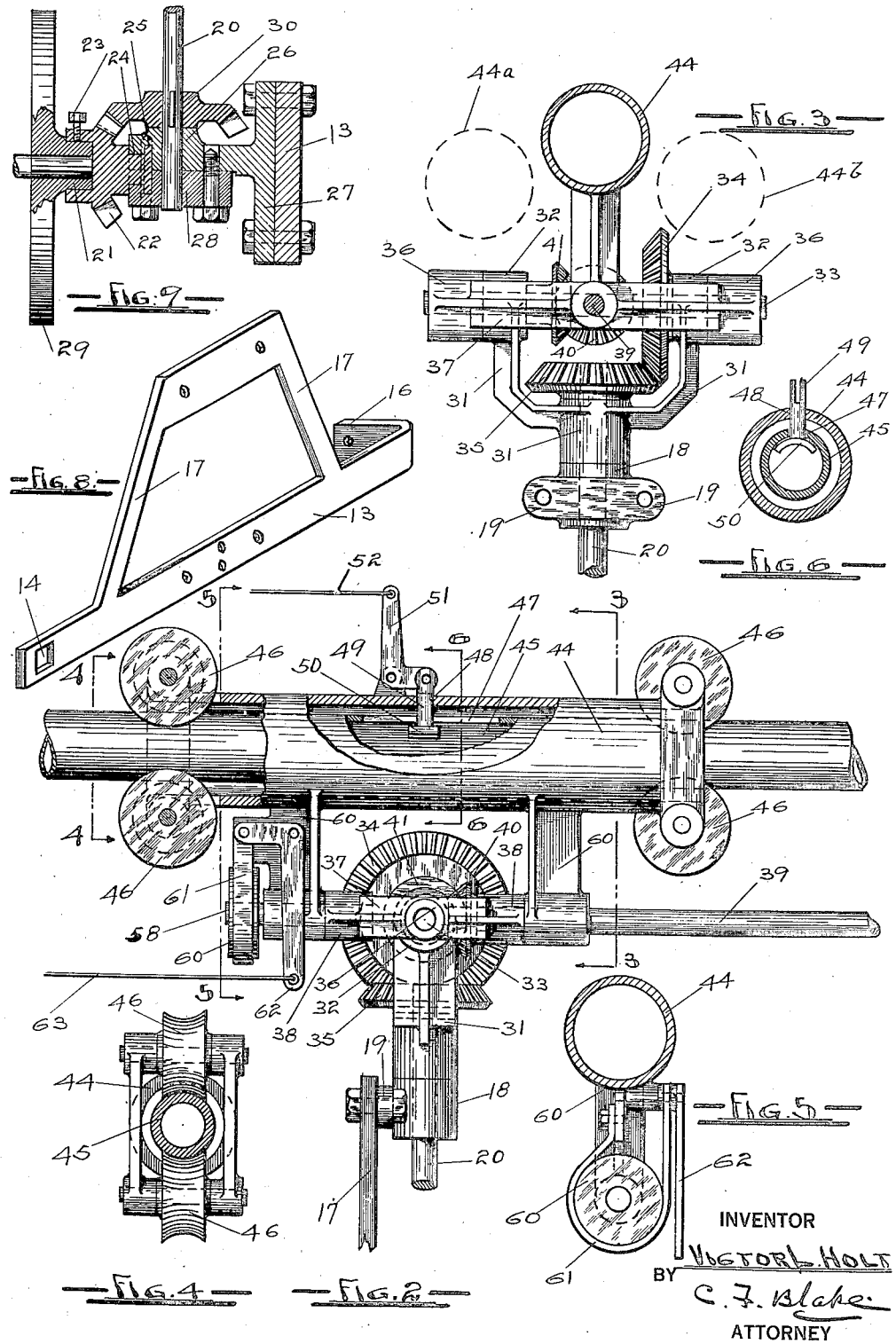

Patented Oct. 30, 1923.

1,472,394

UNITED STATES PATENT OFFICE.

VICTOR L. HOLT, OF PORTLAND, OREGON.

SAW ATTACHMENT FOR TRACTORS.

Application filed March 28, 1921. Serial No. 456,402.

*To all whom it may concern:*

Be it known that I, VICTOR L. HOLT, a citizen of the United States, residing at Portland, county of Multnomah, State of Oregon, have invented certain new and useful Improvements in Saw Attachments for Tractors, of which the following is a specification.

My invention relates to saw attachments for tractors in general, and particularly to such attachments for what are known as garden tractors, the object of my invention being to provide means for mounting a saw thereupon and for operating said saw by means of the power of the tractor; a further object of my invention is to so mount said saw that it may be for land clearing operations to saw up the brush and light timbers as they are encountered on the ground.

I accomplish the above objects by means of the construction illustrated in the accompanying drawings, which are a part of this application for Letters Patent, like characters of reference indicating like parts throughout the several views thereof, and in which:

Fig. 1 is a side elevation of a garden tractor with my device attached thereto.

Fig. 2 is a side elevation of the upper or universal head.

Fig. 3 is a sectional elevation upon line 3—3 of Fig. 2.

Fig. 4 is a section upon line 4—4 of Fig. 2.

Fig. 5 is a section upon line 5—5 of Fig. 2.

Fig. 6 is a section upon line 6—6 of Fig. 2.

Fig. 7 is a perspective view of the yokes constituting the universal head.

Fig. 8 is a perspective view of the supporting member.

Fig. 9 is a sectional elevation of the drive mechanism attached to the tractor fly wheel.

Fig. 10 is a plan view of the extremity of my device, showing the means of attaching the saw blade thereto.

Fig. 11 is a side elevation of the subject matter of Fig. 10.

Fig. 12 is a side elevation of the extremity of my device showing means of attaching an auger thereto.

In general my device consists of a suitable frame for attachment to the garden tractor, a vertical shaft mounted upon said frame and means to drive said shaft from the tractor, a universal head upon the upper end of said shaft, a telescopic member mounted upon said universal head with means of mounting a tool, such as a saw or auger or the like, upon the extremity, and means of operating said tool from said universal head.

The frame upon which the device is mounted can be variously designed to suit the different tractors in use, a preferred frame suitable for most such tractors being that illustrated in Figs. 1 and 8, which consists of a horizontally disposed bar 13, one end of which is provided with an orifice 14 adapted to receive the tool bar 15 of the tractor, and the other end of which is provided with a foot 16 adapted to be bolted to the front of the tractor, and arising therefrom a standard 17. A bracket 18 is provided with ears 19 adapted to be bolted upon the upper end of said standard and thus form a support for the vertical shaft 20.

The fly wheels of such tractors are usually provided with a hub 21 upon which to mount various power members as shown in Fig. 9, and thereupon I mount a bevel pinion 22 by means of a set screw 23. The opposite end of said bevel pinion 22 is provided with a slot 24 thus forming a flange 25 thereupon, and a bearing is provided for the lower end of shaft 20 which bearing consists of a body portion 26 and flanges 27 adapted to be bolted upon the bar 13 of the supporting frame.

Said bearing is provided with a cap 28, the cap and bearing body being recessed to receive the flange 25 of the bevel pinion 22, as shown in detail in Fig. 9. By this construction the frame member 13 is secured in rigid relationship to the fly wheel 29 of the tractor preventing any tendency to spring away therefrom, while at the same time permitting free rotation of the bevel pinion 22.

Mounted upon shaft 20 is a bevel gear 30 in mesh with the bevel pinion 22, thus driving the shaft 20 from the fly wheel of the tractor.

Mounted upon the upper end of the shaft 20 is the universal head, which is constructed of various members as follows.

Rotatably mounted upon the shaft 20 is a forked yoke 31, the arms of said forked yoke terminating in alined bearings 32 in which bearings is mounted a shaft 33. A bevel gear 34 is secured upon said shaft 33 and meshes with a bevel gear 35 secured upon the upper end of shaft 20 within the yoke 31, as shown in Fig. 1, and in detail in Figs. 2 and 3. Thus the shaft 33 is driven from the shaft 20 while free to rotate through an arc of 360 degrees in a plane normal to the shaft 20, because of the yoke 31.

The shaft 33 is extended beyond the ends of the bearings 32 to receive thereupon the bearings 36 of a rectangular frame or yoke 37, said yoke having thereupon oppositely disposed alined bearings 38 centrally located upon the sides thereof not occupied by the bearings 36. A shaft 39 is mounted within one of the bearings 38 and projected into the yoke 37 sufficiently to have secured thereupon a bevel gear 40 which bevel gear meshes with a bevel gear 41 secured upon the shaft 33. By means of this construction the shaft 39 may be rotated through a considerable angle in a vertical plane, or a plane normal to the shaft 33, while being continuously driven therefrom by the bevel gears 40 and 41.

The axes, or the axes projected of the shafts 20, 33 and 39 meet in a common point, as will be seen from inspection of Fig. 7, so that the shaft 39 may be rotated through a horizontal plane through an arc of 360 degrees and simultaneously rotated through a considerable arc in a vertical plane while being continuously driven from the shaft 20. It is therefore evident that the tool, such as the saw 42 or auger 43, or any tool that might be applicable to a device of this character, may be raised or lowered, or swung from side to side at the pleasure of the operator while being continuously operated from the tractor.

It is necessary, however, to move the tool in a longitudinal direction parallel to the shaft 39, and this is provided for as follows. A preferably tubular member 44 is mounted upon the universal head above described, and therein is provided a slidable member 45 operating upon suitable anti-friction rollers 46 located at each end of the tube 44, as shown in detail in Fig. 2. To prevent said slidable member 45 from rotating within the tubular member 44 and also to provide means of securing said slidable member in any desired position relative to member 44 I provide a slot 47 in the member 45 and an orifice 48 in the member 44, and through said orifice and said slot I pass a pin 49 having upon the inner end thereof a shoe 50 adapted to contact with the inner surface of the member 45. The outer end of the pin 49 is slotted and pivotally connected to one arm of a bell crank 51, which bell crank is operated by a reach rod 52 which terminates in rachet teeth 53 coacting with a suitable rest 54, as shown in Fig. I, so that the pin 49 may be operated by said reach rod to draw the shoe 50 tight upon the inner surface of the member 45 and thus prevent it from sliding within the member 44. The pin 49 also prevents relative rotation of the members 44 and 45 while allowing relative longitudinal movement thereof when the shoe 50 is released. By this means it is obvious that the tool mounted upon the outer end of member 45 may be moved towards or from the tractor and secured in any position desired. It is also evident that such movement may be made simultaneously with any of the movements made possible by the universal head described above.

The shaft 39 is the shaft that directly drives the tool that is mounted upon the member 45, and therefore means must be provided for lengthening and shortening said shaft as the member 45 is moved from or towards the tractor. To accomplish this I provide upon the outer end of the member 45 a bracket 55 secured to the member 45 and having thereupon a shaft bearing parallel to the member 45, as shown in Figs. 1, 11 and 12. A shaft 56 is rotatably mounted within a bearing upon the bracket 55 and upon said shaft 56 is secured a shaft 57, said shaft 57 having a squared bore to receive the squared end of the shaft 39, as shown in Fig. 1. Thus the member 45 may be longitudinally moved while the shaft 56 is continuously driven from the shaft 39.

When using the saw 42 it is necessary that the same may rotate in any plane either vertical or inclined, within certain limits, and this I provide for by mounting the member 44 upon the universal head so that it may rotate about the shaft 39 as follows. Within one of the bearings 38 upon the yoke 37 of the universal head opposite to that occupied by the shaft 39 I mount a stud or short shaft 58 secured within said bearing by a set screw 59. Arms 60 integral with member 44 are provided terminating in bearings suitable to be mounted upon the shaft 39 and the stud 58 respectively, and since said shaft and said stud are in line one with the other it is evident that member 44, and with it member 45, may be rotated about the shaft 39, and thus the saw made to operate in any desired plane.

The member 44 may be placed in any position between the positions 44ª and 44ᵇ shown in Fig. 3, and while operating the saw in any plane it is necessary to secure the member 44 at the desired angle, which I accomplish as follows.

Upon an extension of the stud 58 I secure a brake wheel 60', and thereupon I provide a brake band 61 which is operated by a bell crank 62 fulcrumed upon one of the arms 60 of the member 44. Said bell crank is operated by means of a reach rod having ratchet teeth 64 thereupon and operating upon a suitable rest 65.

Means must be provided for mounting tools upon the outer end of the device, that for the saw being as follows.

Secured to the outer end of the member 45 is a forked member 66 upon the extremities of the arms of which are provided suitable bearings 67 for the saw arbor 68, the saw 42 being mounted upon one end of said arbor outside one of the bearings 67, as shown in Fig. 10. The shaft 56 terminates in a socket 69 the axis of which produced intersects the axis of the saw arbor 68. A short shaft 70 is secured within said socket 69 by a set screw 71, and projecting through a bearing 72 upon the forked member 66 has mounted thereupon a bevel gear 73 which meshes with a bevel gear 74 secured to the saw arbor 68.

It can be thus seen that the saw 42 is driven from the tractor upon which the device is mounted, and that while being so driven it may be placed to rotate within any desired plane, either vertical or inclined, may be moved towards or from the tractor, may be raised or lowered through a vertical arc, and may be rotated entirely about the tractor in a horizontal plane, at the will of the operator.

An abutment against which the material being sawed is placed is provided in the shape of a rod 75 mounted upon the forked member 66 and adapted to extend downward behind the saw 42.

The saw attachment may be removed from the device by loosening the set screws 71 and 76 and withdrawing the forked member 66 and attached parts from the member 45.

When the saw attachment is thus removed the lower end of the device looks as shown in Fig. 12, and other tools, such as the auger 43 may be secured within the socket 69.

A suitable hand wheel 80 is provided upon the upper end of the member 45 for operating the latter.

My device may be made of any size and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A frame attachable to a power vehicle; a vertically disposed shaft journaled upon said frame; means to operate said shaft from said vehicle; a universal head mounted upon said vertical shaft; a longitudinally slidable member mounted upon said universal head to oscillate independently thereof; means to mount a tool upon one end of said slidable member; and means to drive said tool from said vertical shaft through mechanism within said universal head.

2. Mechanism for mounting a tool upon a tractor so as to be capable of pivotal movement in three planes at right angles each to every other, and about three axes intersecting at a common point; means for moving said tool from or towards said tractor; and means for driving said tool from said mechanism.

3. Universally oscillatable means for mounting tool holding mechanism upon a tractor and driving said tool from said tractor, comprising: a vertical shaft driven from said tractor; a forked yoke rotatably mounted upon the upper end of said vertical shaft; a horizontal shaft journaled in said yoke; a frame oscillatably mounted upon said horizontal shaft; a tool driving shaft journaled upon said frame in the axial plane of said horizontal shaft and normal thereto; gears within said yoke and said frame connecting said vertical shaft with said horizontal shaft; gears within said yoke and said frame connecting said horizontal shaft with said tool driving shaft; a stud upon said frame alined with said tool driving shaft; a tubular member journaled upon said tool driving shaft and upon said stud; a member slidable within said tubular member; and tool holding mechanism upon one extremity of said slidable member.

4. A horizontally extensible member; a shaft parallel to said member; means to oscillatably mount said extensible member upon said shaft; a tool mounted upon said member; means to drive said tool from said shaft; a power driven shaft; and means capable of universal movement for driving said first mentioned shaft from said power driven shaft.

5. In a device for mounting tools upon a tractor: a substantially horizontally disposed tubular member; a member longitudinally slidable within said tubular member and carrying a tool upon the outer end thereof; a universal head mountable upon the tractor; a shaft mounted upon said head parallel to said tubular member; arms mounting said tubular member rotatably upon said shaft; and mechanism upon said shaft for driving said tool.

6. A tractor; a power transmitting head capable of universal movement upon said tractor; a tool driving shaft mounted upon said head; a tubular member mounted upon said shaft and spaced therefrom and parallel therewith; a tool bearing member slidably mounted within said tubular member; and means for driving a tool mounted upon said tool bearing member from said shaft.

In witness whereof I claim the foregoing as my own I hereunto affix my signature in the presence of two witnesses at Portland, county of Multnomah, State of Oregon, this 21st day of March, 1921.

VICTOR L. HOLT.

Witnesses:
L. J. ROBINSON,
C. F. BLAKE.